United States Patent [19]

Sands

[11] Patent Number: 4,473,667

[45] Date of Patent: Sep. 25, 1984

[54] ELASTOMERIC FOAM

[75] Inventor: Bruce W. Sands, Malvern, Pa.

[73] Assignee: Dow Corning Corporation, Midland, Mich.

[21] Appl. No.: 391,899

[22] Filed: Jun. 25, 1982

[51] Int. Cl.$^3$ .............................................. B29D 27/00
[52] U.S. Cl. .................................. 521/122; 264/45.3; 264/50; 521/126; 521/154
[58] Field of Search ................. 264/50, 45.3; 521/154, 521/96, 122, 126

[56] References Cited

U.S. PATENT DOCUMENTS

| | | | |
|---|---|---|---|
| 2,432,353 | 12/1947 | Talalay | 260/723 |
| 2,760,941 | 8/1956 | Iler | 264/50 X |
| 2,891,920 | 6/1959 | Hyde et al. | 260/29.2 |
| 3,294,725 | 12/1966 | Findlay et al. | 528/23 X |
| 3,311,115 | 3/1967 | Mueller et al. | 264/50 X |
| 3,491,033 | 1/1970 | Dunn | 521/72 |
| 4,221,688 | 9/1980 | Johnson et al. | 260/29.2 M |
| 4,368,279 | 1/1983 | Modic et al. | 521/74 X |
| 4,391,765 | 7/1983 | Lee et al. | 264/26 |

OTHER PUBLICATIONS

Carl, "Neoprene Latex", E. I. DuPont, DeNemours and Co. (Inc.) 1962.

Primary Examiner—Philip E. Anderson
Attorney, Agent, or Firm—Edward C. Elliott

[57] ABSTRACT

A simplified method of manufacturing a silicon elastomeric foam comprises mechanically generating a stable froth of an aqueous silicone emulsion, while adding surfactant and thickener, then removing the water from the stable froth. The emulsion consists essentially of anionically stabilized hydroxyl endblocked polydiorganosiloxane, colloidal silica, an organic tin compound, and water, the emulsion having a pH in the range of 9 to 11.5 inclusive. The dried foam is an elastomeric, cellular structure possessing typical silicone elastomer heat stability.

9 Claims, No Drawings

ELASTOMERIC FOAM

BACKGROUND OF THE INVENTION

1. Field of the Invention

This invention relates to a method of producing a silicone elastomeric foam from an aqueous emulsion of anionically stabilized, hydroxyl endblocked polydiorganosiloxane, colloidal silica, organic tin compound, and water.

2. Description of the Prior Art

A method of foam production from elastomeric emulsions is known as the Talalay process. As described in U.S. Pat. No. 2,432,353, issued Dec. 13, 1938, a natural rubber latex is compounded with curing agents, then caused to expand by mixing with hydrogen peroxide. While expanding, the mixture is poured into an aluminum mold. After the expanding mixture fills the mold, the contents of the mold are frozen by immersing the mold in a brine at $-30°$ C. The mold is then connected to a vacuum and a supply of alkaline calcium chloride brine at $-2°$ C. is drawn through the expanded, frozen mixture to cause an irreversible coagulation to take place. The mold is then transferred to a live steam vulcanizer where it is heated for 25 minutes at $125°$ C. to vulcanize the natural rubber. The vulcanized foam article is then removed from the mold, washed, centrifugally extracted and dried. Talalay teaches the preliminary formation of the foam can be effected by any of the known procedures, such as mechanical whipping, chemical gas generation, or physical release of gas or vapor.

In the book, "Neoprene Latex", by J. C. Carl, published by E. I. Dupont DeNemours and Co. (Inc.) (1962) a process of converting specialized neoprene latex to foam is described. The latex fillers, curing agent, accelerator, and foam stabilizing surface active agents are mixed, then the mixture is stirred rapidly to whip in air and create a froth. The froth is stirred until it is refined to a smooth cream. A gelling agent is then added and the froth placed in a mold. The foam produced by the gelling of the froth is usually cured by exposure to steam. After curing, the foam is washed and dried.

The processes as discussed above require the gelling of the froth to stabilize the foam by the use of either an internal gelling agent as discussed for a neoprene latex or an external gelling agent as discussed with a natural rubber latex. This gelling step must be carefully controlled in order to produce satisfactory foam. Dunn in U.S. Pat. No. 3,491,033, issued Jan. 20, 1970, describes a process of making a solid cellular material that does not contain a gelling step. Dunn states that the process is applicable to any polymer that is available in the form of an aqueous emulsion and is film forming at a temperature below $300°$ F. Dunn shows examples of foam production with natural rubber latex, butadiene-styrene latex, and also emulsions of thermoplastic polymers such as polyethylene and vinylchloride. His process is carried out by adding a foaming agent, incapable of gelling the wet foam, to an aqueous dispersion, forming the mixture into a wet foam, drying the wet foam into a solid cellular material, and heating the solid cellular material to the film-forming temperature of the polymer. Dunn uses relatively large amounts of foaming agents to allow the foam structure to retain its cellular shape during the drying step. The instant invention does not fall under Dunn as the emulsion cannot be dried to a solid cellular material as called out by Dunn without gelling the foam which is contrary to the requirement of Dunn.

SUMMARY OF THE INVENTION

A silicone elastomeric foam is produced by mechanically generating a stable froth from an emulsion while adding surfactant and thickener to make the froth stable, then removing the water from the stable froth to form a silicone elastomeric foam. The emulsion, having a pH in the range of 9 to 11.5 inclusive, consists essentially of 100 parts by weight of anionically stabilized, hydroxyl endblocked polydiorganosiloxane in the form of an aqueous emulsion, at least one part by weight colloidal silica, an organic tin compound, and water.

The silicone elastomeric foam produced by the method of this invention is an open-cell foam. The process is an easy one, requiring only the production of a stable froth, then removal of the water from the system such as by heating in an oven or by air drying at room temperature. There is no separate coagulation and vulcanization step as required by other methods of producing foam. The silicone elastomeric foam produced by this invention has excellent heat stability. The method of this invention can be performed without using a blowing agent so that there are no problems from toxic vapors or gases given off during the processing.

DESCRIPTION OF THE INVENTION

This invention relates to a method of producing a silicone elastomeric foam comprising (i) mechanically generating a stable froth from an aqueous silicone emulsion suitable to provide an elastomeric product upon removal of the water, said emulsion comprising 100 parts by weight of anionically stabilized hydroxyl endblocked polydiorganosiloxane, having an average molecular weight of greater than 10,000, in the form of an aqueous emulsion having a pH in the range of 9 to 11.5 inclusive; at least one part by weight colloidal silica; an organic tin compound; and water; adding sufficient anionic or nonionic surfactant and thickener to make the froth stable until the water is removed in step (ii), and then, (ii) removing the water from the stable froth to form a cured elastomeric foam.

The method of this invention, using the emulsion specified, allows the production of silicone elastomeric foam by a very simple process. The emulsion is expanded into a stable froth, then the water is removed from the emulsion to yield an elastomeric silicone foam. The composition of the emulsion is such that the stable froth, formed as a first step, is maintained until the water has been removed, forming a cured, elastomeric foam. Once the water is removed, the originally liquid emulsion is a dry, cured elastomeric foam.

The emulsion used in this invention contains an anionically stabilized, hydroxyl endblocked polydiorganosiloxane in the form of an aqueous emulsion, colloidal silica, and an organic tin compound. These ingredients, used as specified in this invention, when dried produce a cured elastomeric material. Adding a thickener and surfactant to the above ingredients allows the production of a mixture which can be expanded into a stable froth. The surfactant aids in the potential for air entrapment during the mechanical generation of the froth and more uniform and smaller sized cells in the froth. The thickening agent aids in adjusting the viscosity of the froth so that the froth is rigid enough to maintain itself, yet not so thick that it cannot form a froth. The stable froth is of such a nature that it maintains the emulsion as a froth while the water is removed. Because of the composition of the emulsion being used, the result is a cured, elastomeric foam.

In a batch mixing operation the anionically stabilized hydroxyl endblocked polydiorganosiloxane emulsion is placed in a mixing container, the colloidal silica is stirred in, the organic tin compound is added as an emulsion, and sufficient amine is added to adjust the pH to the required range. Then surfactant and thickener are stirred in. The amount of surfactant and thickener can be adjusted during the mechanical generation of the froth. The resultant froth should be a stiff mass that will retain its shape and that contains a multitude of finely distributed cells or bubbles. The stable froth at this point may resemble the familiar whipped cream or shaving foam.

The mechanical generation of the stable froth can consist of rapidly stirring the emulsion in an open container. It can also consist of such methods as bubbling air into a container of emulsion or injecting air into the emulsion while stirring in a closed system such as an extruder.

The composition of the emulsion that is used in the method of this invention to produce an elastomeric foam allows the stable froth to be transformed into an elastomeric foam by removing the water. Removing the water results in a cured elastomer foam without any other ingredients or steps being necessary.

The elastomeric foam resulting from removing the water from the stable froth is fully cured. This step can be accomplished by evaporating the water by heating the stable froth. The stable froth can be heated by placing it in a hot air oven, for example. Cured foam can also result from room temperature air drying of the stable froth, although it is more difficult to produce a froth that is stable throughout air drying than throughout oven drying.

The composition of the emulsion used in the method of this invention must produce a froth which is stable until the water is removed. The stability of the froth is a function of the viscosity of the final emulsion among other things. The viscosity of the emulsion is a function of the ingredients used. The anionically stabilized hydroxyl endblocked polydiorganosiloxane used in this invention should be one in which the polymer has a high molecular weight, thus a high viscosity. The use of colloidal silica dispersion having a high solids content, for example 50 percent by weight colloidal silica, also aids in successful froth production. A fume silica can be added to the emulsion to raise the solids content and increase the viscosity and stiffness of the froth. Additional semi-reinforcing and extending fillers such as diatomaceous earth, finely ground quartz, alkaline clays, titanium dioxide, and non-acidic carbon black may be added. Common additives for silicone elastomers such as heat stability additives, compression set additives, and pigments are selected to maintain the emulsion at a pH in the range of 9 to 11.5 inclusive. Surfactant is used in the emulsion to reduce the surface tension and aid in the production of bubbles. The stiffness and stability of the froth is also aided by the use of a thickener which is added before or during the generation of the froth in an amount sufficient to make the froth stable throughout the water removal step. The preferred amount of thickener is easily found by simple experiment as shown in the Example.

As the water is removed from the froth there is a certain amount of shrinkage in volume. The actual amount of shrinkage depends upon such variables as the solids content of the emulsion, the stability of the froth, and the method of removing the water, as well as the actual shape and dimensions of the froth that is dried. The froth can shrink to as little as ⅓ of the original volume, but a useful cured silicone elastomeric foam still results. The shrinkage can be allowed for in determining the dimensions of the froth before drying. For instance, if a finished foam thickness of 2 mm bonded to a cloth substrate is desired, the froth would be placed upon the cloth in a greater thickness, 6 mm for example, to allow for the shrinkage during drying.

The emulsion used in the method of this invention comprises water, an anionically stabilized hydroxyl endblocked polydiorganosiloxane, an organic tin compound, and colloidal silica, the emulsion having a pH in a range of 9 to 11.5 inclusive. Such an emulsion is described in U.S. Pat. No. 4,221,688, issued Sept. 9, 1980 to Johnson, Saam, and Schmidt, said patent being hereby incorporated by reference to describe the emulsion and how to manufacture it.

The hydroxyl endblocked polydiorganosiloxanes are those which can be emulsified and which impart elastomeric properties to the product obtained after the removal of the water from the emulsion. Such hydroxyl endblocked polydiorganosiloxanes should have a weight average molecular weight ($\overline{M}w$) of at least 10,000. Hydroxyl endblocked polydiorganosiloxanes with a lower $\overline{M}w$ range, such as 5000 to 10,000, do not provide strong elastomeric products. Tensile strengths and elongations at break improve with increasing molecular weight, with reasonable tensile strengths and elongations obtained above 30,000 $\overline{M}w$ and the best tensile strengths and elongations obtained above 50,000 $\overline{M}w$. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical. The preferred $\overline{M}w$ for the hydroxylated polydiorganosiloxanes are in the range of 200,000 to 700,000. The viscosity of the polymer obtained upon removal of the water from the emulsion will vary from about 75 Pa.s at 25° C. to about 4,000 Pa.s at 25° C. with the preferred range from about 1,000 Pa.s at 25° C. to 3,000 Pa.s at 25° C.

The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl and phenyl and examples of 2-(perfluoroalkyl)ethyl radicals include 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom, that may include trace amounts of monoorganosiloxane or triorganosiloxy groups present as impurities of the manufacturing process. The preferred hydroxyl endblocked polydiorganosiloxanes are the hydroxyl endblocked polydimethylsiloxanes.

The most preferred hydroxyl endblocked polydiorganosiloxanes are those prepared by the method of anionic emulsion polymerization described by Findlay et al. in U.S. Pat. No. 3,294,725, issued Dec. 27, 1966, which is hereby incorporated by reference to show the methods of polymerization and to show the hydroxyl endblocked polydiorganosiloxane in emulsion. Another method of preparing hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes and their method of preparation. These methods and others are known in the art. The hydroxyl endblocked polydiorganosiloxanes used in the emulsion are those which are anionically stabilized. As used herein, "anionically stabilized" means the hydroxyl endblocked polydiorganosiloxane is stabilized in emulsion with an anionic surfactant.

Anionic surfactants are preferably the salt of the surface active sulfonic acids used in the emulsion polymerization to form the hydroxyl endblocked polydiorganosiloxane as shown in U.S. Pat. No. 3,294,725, cited above, which is hereby incorporated by reference to show the surface active sulfonic acids and salts thereof. The alkali metal salts of the sulfonic acids are preferred, particularly the sodium salts. The sulfonic acid can be illustrated by aliphatically substituted benzenesulfonic acids, aliphatically substituted naphthalene sulfonic acids, aliphatic sulfonic acids, silylalkylsulfonic acids and aliphatically substituted diphenylethersulfonic acids.

One of the advantages of the emulsions described herein is the relatively small amount of surfactant or emulsifying agent needed to maintain a stable emulsion. The amount of anionic emulsifying agent can be less than 2 weight percent of the emulsion, wherein this amount can result from the neutralized sulfonic acid wherein the sulfonic acid is used in the emulsion polymerization method for the preparation of the hydroxyl endblocked polydiorganosiloxane. Other anionic emulsifying agents can be used, for example alkali metal sulforicinoleates, sulfonated glyceryl esters of fatty acids, salts of sulfonated monovalent alcohol esters, amides of amino sulfonic acids such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate, and sodium lauryl ether sulfate.

Although not specifically required, one can optionally include nonionic emulsifying agents in addition to the anionic emulsifying agents. Such nonionic emulsifying agents can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide, such as condensation products of ethylene oxide with isododecyl, and imine derivatives such as polymerized ethylene imine.

Colloidal silica is a required ingredient of the emulsions. Any of the colloidal silicas can be used. These colloidal silicas are well known in the art and many are commercially available. Although any of the colloidal silicas can be used, including fume colloidal silicas and precipitated colloidal silicas, the preferred colloidal silicas are those which are available in an aqueous medium. Colloidal silicas in an aqueous medium are usually available in a stabilized form, such as those stabilized with sodium ion, ammonia or an aluminum ion. Aqueous colloidal silicas which have been stabilized with sodium ion are preferred because the pH requirement can be met by using such a sodium ion stabilized colloidal silica without having to add additional ingredients to bring the pH within the range of 9 to 11.5. The term "colloidal silica" as used herein are those silicas which have particle diameters of from 0.0001 to 0.1 micrometer. Preferably, the particle diameters of the colloidal silicas are from 0.001 to 0.05 micrometer. The relative amounts of hydroxyl endblocked polydiorganosiloxane and colloidal silica can vary over a wide range, such as from 1 part to 150 parts by weight of colloidal silica for each 100 parts by weight of hydroxyl endblocked polydiorganosiloxane. Amounts of colloidal silica from 10 to 50 parts by weight for each 100 parts by weight of hydroxyl endblocked polydiorganosiloxane are preferred in the method of the instant invention.

The silicone emulsion has a continuous water phase in which there is a dispersed phase which comprises an anionically stabilized hydroxyl endblocked polydiorganosiloxane and colloidal silica. For this silicone emulsion to maintain a storage stability and also be curable to an elastomer after the emulsion is stored, the pH of the silicone emulsion must be within the range of 9 to 11.5 inclusive. The silicone emulsions which have the best storage stability and still have the ability to form elastomers at ambient conditions at any point during the storage stable period are those which have a pH in the range of 10.5 to 11.2.

A silicone emulsion of hydroxyl endblocked polydiorganosiloxane and colloidal silica does not provide a useful elastomeric product when the water is allowed to evaporate at ambient conditions immediately after the emulsion is prepared. An aging period is necessary before an elastomer can be formed from the emulsion, but such an aging period can take a long time, such as up to five months. The addition of an organic tin compound, preferably a dialkyltindicarboxylate, can be used to reduce the aging period to one to three days. After the aging period, an elastomeric product can be obtained from the removal of the water under ambient conditions. Dialkyltindicarboxylate can be used in amounts of from 0.1 to 2 parts by weight for each 100 parts by weight of the hydroxyl endblocked polydiorganosiloxane, preferably about 0.25 to 1.5 parts by weight are used. Dialkyltindicarboxylates include dibutyltindiacetate, dibutyltindilaurate, and dioctyltindilaurate. The preferred dialkyltindicarboxylate is dioctyltindilaurate.

The long-term storage stability of the emulsion has been found to be improved by the addition of an organic amine. The organic amine can be primary, secondary, or tertiary amines which contain carbon, hydrogen, and nitrogen, and can also contain oxygen, and which are water soluble in the amounts required. These organic amines include diethylamine, ethylenediamine, butylamine, hexylamine, morpholine, monoethanolamine, triethylamine, and triethanolamine. The preferred amine is diethylamine. The organic amines can be added neat or in aqueous emulsion provided that they do not cause the anionically stabilized hydroxyl endblocked polydiorganosiloxane emulsion to break during their addition. For this reason, it is preferable to add the amine as an aqueous solution.

A thickening agent is used to adjust the viscosity or stiffness of the froth so that the froth is maintained until the water is removed. Suitable thickeners are available commercially and would be selected for their stability and v ability in thickening the emulsion at a pH in the range of 9 to 11.5 inclusive. Some of the useful thickeners include the classes of cellulose derivatives, alkali salts of polyacrylates and polymethacrylates, sodium and ammonium salts of carboxylate copolymers, and colloidal clays. These and other thickeners can be used but it is advisable that a particular thickener be tried on a small scale to determine that it does not adversely effect the storage stability of the emulsion or the resulting properties of the elastomeric foam.

The method of this invention is useful for producing silicone elastomeric foam. The method yields a generally open-cell foam with a fibrillar structure that appears stronger than other types of silicone open-cell foams such as those prepared from room temperature curing silicone elastomers. The method can be performed without using anything other than air and water for froth producing agents, and therefore there are no toxicity or pollution problems with this method of foam production. The simplicity of the method of this invention enables the use of existing equipment. Gelling agents used in many other methods are not required to gel a froth by the present method. The dried foam requires no film forming or curing step other than removing the water from the emulsion.

The density of the foam is easily regulated by the amount of air introduced while generating the froth. The amount of stable froth to be preformed or layed down on a substrate is easily determined since the froth can be generated in a stable form, then layed down in the final amount desired, allowing for shrinkage. The silicone elastomeric foam is useful for applications needing an open-cell foam with elastomeric properties that resist extremes of temperature or long-term aging effects, such as cushioning and clothing insulation useful at temperature extremes.

The following example is included for illustrative purposes and should not be construed as limiting the scope of the invention which is properly delineated in the claims. All parts are parts by weight.

EXAMPLE

A series of foams were prepared by mechanically beating air into an emulsion to produce a stable froth, then removing the water by different methods.

A hydroxyl endblocked polydimethylsiloxane emulsion was prepared by homogenizing hydroxyl endblocked polydimethylsiloxane fluid of about 35 siloxane units, sodium lauryl sulphate emulsifier, and water, then polymerizing with dodecyl benzene sulfonic acid catalyst. The emulsion had a pH of about 7.5, a solids content of about 50% by weight and the viscosity of the hydroxyl endblocked polydimethylsiloxane removed from the emulsion was about 300 Pa.s at 25° C.

A reinforced emulsion was prepared by mixing 200 parts of the above hydroxyl endblocked polydimethylsiloxane emulsion, 100 parts of a sodium ion stabilized colloidal silica dispersion present as a 30 percent by weight dispersion in water, 2 parts of an aqueous emulsion of 50 percent by weight dioctyltindilaurate, and 0.5 part morpholine.

A froth was prepared from this reinforced emulsion by mixing 200 g in a Hobart mixer with 1 g of sodium lauryl sulphate. The mixture expanded to some extent but the viscosity was too low and the froth collapsed on sitting. By adding 9 g of acrylic thickener slowly with beating, the mixture expanded, but was too thick and attached to the beaters, losing most of the entrapped air. By slowly adding an additional 125 g of the reinforced emulsion, the mixture gradually expanded into a stable froth of about 46 percent by weight solids content.

A portion of the stable froth was drawn down to a 1.3 mm thick sheet on a polytetrafluoroethylene surface and allowed to air dry. A similar sheet was placed in an oven at about 80° C. The air-dried sheet took about 24 hours to dry, shrinking to about ⅓ of the original thickness. The oven dried sheet took 1 hour to dry, shrinking to about ⅔ of the original thickness. The cells enlarged during the drying. The dried foam had a density of 310 kg/m³.

A portion of the above froth was placed in an 8 oz. polystyrene foam cup. The cup of froth was air dried for 3 days, the froth shrank excessively and the cells were distorted.

A comparative test was prepared to illustrate the importance of the production of a stable froth.

An emulsion was prepared of 200 parts of anionically stabilized polydimethylsiloxane emulsion with a pH of about 8, 52 percent by weight polymer and an average molecular weight of greater than 10,000; 100 parts of a sodium stabilized colloidal silica dispersion of 15% by weight solids; 20 parts of finely divided titanium dioxide; 2 parts of diethylamine; and 1 part of an aqueous emulsion of 50 percent by weight dioctyltindilaurate. A mixture of 400 g of the above emulsion with 2 g of sodium lauryl sulphate was stirred for 2 minutes with a Kitchen Aid mixer. Then 5 g of an acrylic thickener were stirred in and stirring continued for 2 minutes to yield a white, liquid froth resembling shaving foam. Portions of the froth were placed in containers, then dried by A. placing in an oven heated to 125° C.,
B. placing in an oven heated to 70° C., and
C. storing at room temperature.

Each sample in an oven expanded as it heated, then collapsed during or before curing. The sample at room temperature collapsed during cure.

A comparison of the above comparative test with the Example shows that for each 100 parts of polydimethylsiloxane, the Example used about 4.4 parts of total surfactant, 30 parts of colloidal silica, and 2.8 g of thickener. The comparative test used about 2.4 parts of total surfactant, 15 parts of colloidal silica and 20 parts of titanium dioxide, and 1.25 g of thickener. These formulation differences gave a stiffer froth in the Example than in the comparative test. The stiffer froth of the Example was successfully dried by heating in an oven to give a cured, elastomeric foam.

That which is claimed is:

1. A method of producing a silicone elastomeric foam comprising
   (i) mechanically generating a stable froth from an aqueous silicone emulsion suitable to provide an elastomeric product upon removal of the water, said emulsion comprising 100 parts by weight of anionically stabilized hydroxyl endblocked polydiorganosiloxane, having an average molecular weight of greater than 10,000, in the form of an aqueous emulsion having a pH in the range of 9 to 11.5 inclusive; at least one part by weight colloidal silica; an organic tin compound; and water; adding sufficient anionic or nonionic surfactant and thickener to make the froth stable until the water is removed in step (ii), and then (ii) removing the water from the stable froth by drying in air to form a cured elastomeric foam.

2. The method of claim 1 wherein the stable froth is mechanically generated by mixing air into the emulsion.

3. The method of claim 1 wherein the stable froth of step (i) is transferred to a substrate or mold before the removal of the water.

4. The method of claim 1 wherein the removing the water comprises heating the stable froth.

5. The method of claim 1 wherein the polydiorganosiloxane is a polydimethylsiloxane having an average molecular weight of greater than 50,000, the colloidal silica is greater than 10 parts by weight, and the tin compound is dialkyltindicarboxylate in an amount of from 0.1 to 2 parts by weight.

6. The method of claim 5 wherein the polydimethylsiloxane has an average molecular weight of from 200,000 to 700,000.

7. The method of claim 6 wherein the stable froth is mechanically generated by mixing air into the emulsion by means of a mechanical stirrer.

8. The method of claim 7 wherein the stable froth is transferred to a substrate or mold and the water is removed by heating in hot air.

9. An elastomeric silicone foam produced by the method of claim 1, 2, 3, 4, 5, 6, 7, or 8.

* * * * *